No. 821,397. PATENTED MAY 22, 1906.
W. P. BARTEL.
RIVET.
APPLICATION FILED FEB. 16, 1905.

Witnesses:
William C. Hass.
Ernest A. Telfer.

Inventor:
William P. Bartel,
by his attorney,
Charles S. Goodwin.

UNITED STATES PATENT OFFICE.

WILLIAM P. BARTEL, OF WALTHAM, MASSACHUSETTS, ASSIGNOR TO JUDSON L. THOMSON M'F'G COMPANY, A CORPORATION OF MAINE.

RIVET.

No. 821,397.  Specification of Letters Patent.  Patented May 22, 1906.

Application filed February 16, 1905. Serial No. 245,841.

*To all whom it may concern:*

Be it known that I, WILLIAM P. BARTEL, a citizen of the United States, residing at Waltham, in the county of Middlesex and State of Massachusetts, have invented new and useful Improvements in Rivets, of which the following is a specification.

This invention relates to an improved rivet having a cup-shaped head, such as is used upon the bottom of valises and the like.

The object of the invention is to provide a rivet having a cup-shaped head which will be strong and durable, which can be cheaply constructed, and which when finished will present a neat and ornamental appearance.

The invention consists in the combination and arrangement of parts set forth in the following specification and particularly pointed out in the claim thereof.

Figure 1:
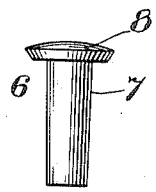
Figure 2:
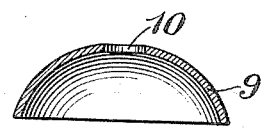
Figure 3:
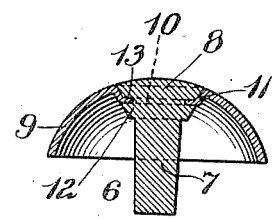
Figure 4:
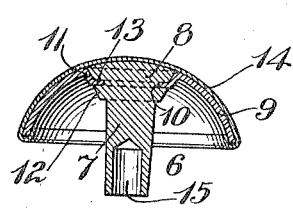
Figure 5:
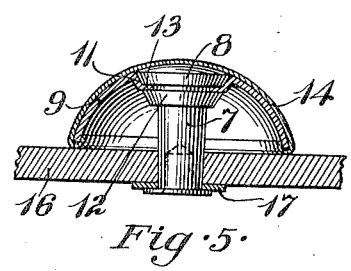

Referring to the drawings, Figure 1 is a side elevation of the shank portion of a rivet with a conical-shaped head or flange upon one end thereof. Fig. 2 is a sectional elevation of the cup-shaped portion forming the head of my improved rivet. Fig. 3 is a sectional elevation of my improved rivet with the shank driven into the head. Fig. 4 is a sectional elevation of my improved rivet, showing the same capped with sheet metal, said cap extending over the cup-shaped portion. Fig. 5 illustrates my improved rivet complete capped and attached to a section of material, the shank being shown in elevation and the head in section.

Like numerals refer to like parts throughout the several views of the drawings.

In the drawings, 6 is a rivet-shank consisting of a stem 7 and a flange 8, formed at one end thereof.

9 is a cup-shaped head formed of sheet metal, said shank and cup-shaped head being illustrated in Figs. 1 and 2, respectively, as they appear before being forced together to form the completed rivet. The cup-shaped head 9 is placed upon a forming-die and the stem 7 driven downwardly through the hole 10 in said cup-shaped head and into a hole in the forming-die, the shank being forced by a suitable-shaped die or driver downwardly until the flange 8 is forced into the head 9, forming a depression 11 in said head, the bottom of said depression having the hole 10 therein and an annular rim 13 surrounding said hole. The stem 7 is upset in the die, forming an annular flange 12 integral with the shank and bearing against the rim 13 upon the opposite side of said rim from that against which the annular flange 8 bears, whereby said rim is securely held between said flanges, said stem projecting from the concave side of said cup-shaped head.

The form of my improved rivet illustrated in Fig. 3 may be used without further finish, or the same may have a sheet-metal cover or cap 14 attached thereto, extending entirely over the cup-shaped head 9, and the flange 8 being fastened securely to the cup-shaped head 9 by rounding the edge of said sheet-metal cover around the edge of said cup-shaped head. A recess 15 is then drilled in the end of the stem 7, forming a tubular-stemmed rivet, or the same may be bifurcated to form a split rivet, if desired.

The rivet in practical use is driven through leather or other sheet material, as illustrated in Fig. 5, in which the stem 7 is shown driven through a piece of sheet material 16 and clenched upon the washer 17 upon the back face of the sheet material.

The advantage secured by the construction hereinbefore described is that a flange of substantial width and thickness is formed upon opposite sides of the rim 13, thus rigidly securing the shank to the cup-shaped head, so that the shank and head of my rivet are sufficiently strong to withstand any strain which may be brought to bear upon them when the stem 7 is driven through the material 16 and clenched upon the opposite side of the material from the head, and, further, said shank and cup-shaped head are so closely secured together that they will not work loose in the practical service or wear to which they may be subjected.

Having thus described my invention, what I claim, and desire by Letters Patent to secure, is—

As an article of manufacture, a rivet consisting of a cup-shaped head formed of sheet metal with a depression formed in the outside of said head, the bottom of said depression having a hole therein and an annular rim surrounding said hole; and a shank consisting of a stem with an annular flange at one end thereof fitting into said depression upon one side of said rim and another annular flange integral with said shank bearing against the opposite side of said rim, whereby said rim is securely held between said flanges, said stem projecting from the concave side of said cup-shaped head.

In testimony whereof I have hereunto set my hand in presence of two subscribing witnesses.

WILLIAM P. BARTEL.

Witnesses:
CHARLES S. GOODING,
ANNIE J. DAILEY.